United States Patent [19]

Pirk

[11] 4,072,461
[45] Feb. 7, 1978

[54] APPARATUS FOR THE PRODUCTION OF LAMINATED BODIES PARTICULARLY, MULTILAYERED SHOE SOLES

[75] Inventor: Harald Pirk, Breuberg, Germany

[73] Assignee: Metzeler Kautschuk AG, Munich, Germany

[21] Appl. No.: 771,736

[22] Filed: Feb. 24, 1977

Related U.S. Application Data

[62] Division of Ser. No. 722,418, Sept. 13, 1976.

[30] Foreign Application Priority Data

Sept. 11, 1975  Germany ............................. 2540433

[51] Int. Cl.$^2$ ....................... B29C 9/00; B29C 11/00; B29H 3/00
[52] U.S. Cl. .................................. 425/515; 425/501; 425/518; 425/119
[58] Field of Search ............... 425/501, 515, 518, 119, 425/129 S

[56] References Cited

U.S. PATENT DOCUMENTS

| | | | |
|---|---|---|---|
| 939,330 | 11/1909 | Saunders | 425/501 |
| 1,354,734 | 10/1920 | Ferguson | 425/501 X |
| 3,676,542 | 7/1972 | Maltby | 425/501 X |

Primary Examiner—J. Howard Flint, Jr.
Attorney, Agent, or Firm—Armstrong, Nikaido & Marmelstein

[57] ABSTRACT

A vulcanization mold for producing laminated bodies, particularly shoe soles of different and/or differently colored rubbers or plastics, the interfacial boundary between adjacent plies of the laminate forming non-planar surfaces, is provided. The mold includes several mold cavities, disposed one on top of the other for forming the individual layers of the laminate, the mold cavities being separated by intermediate plates which are removable from the mold following a prevulcanization to allow for uniting of the premolded individual layers into the desired laminated body. A middle plate freely moveable in the direction of opening and closing of the mold together with two intermediate plates disposed on opposite sides thereof form the mold cavity for a central layer of the laminate, the surfaces of the middle plate being non-planar and corresponding to the adjacent surfaces of the intermediate plates. The laminated bodies are produced by inserting blanks into the mold cavities, shaping and prevulcanizing the blanks, opening the mold and removing the intermediate plates and closing the mold and fully curing the pre-vulcanized layers into the finished composite.

7 Claims, 4 Drawing Figures

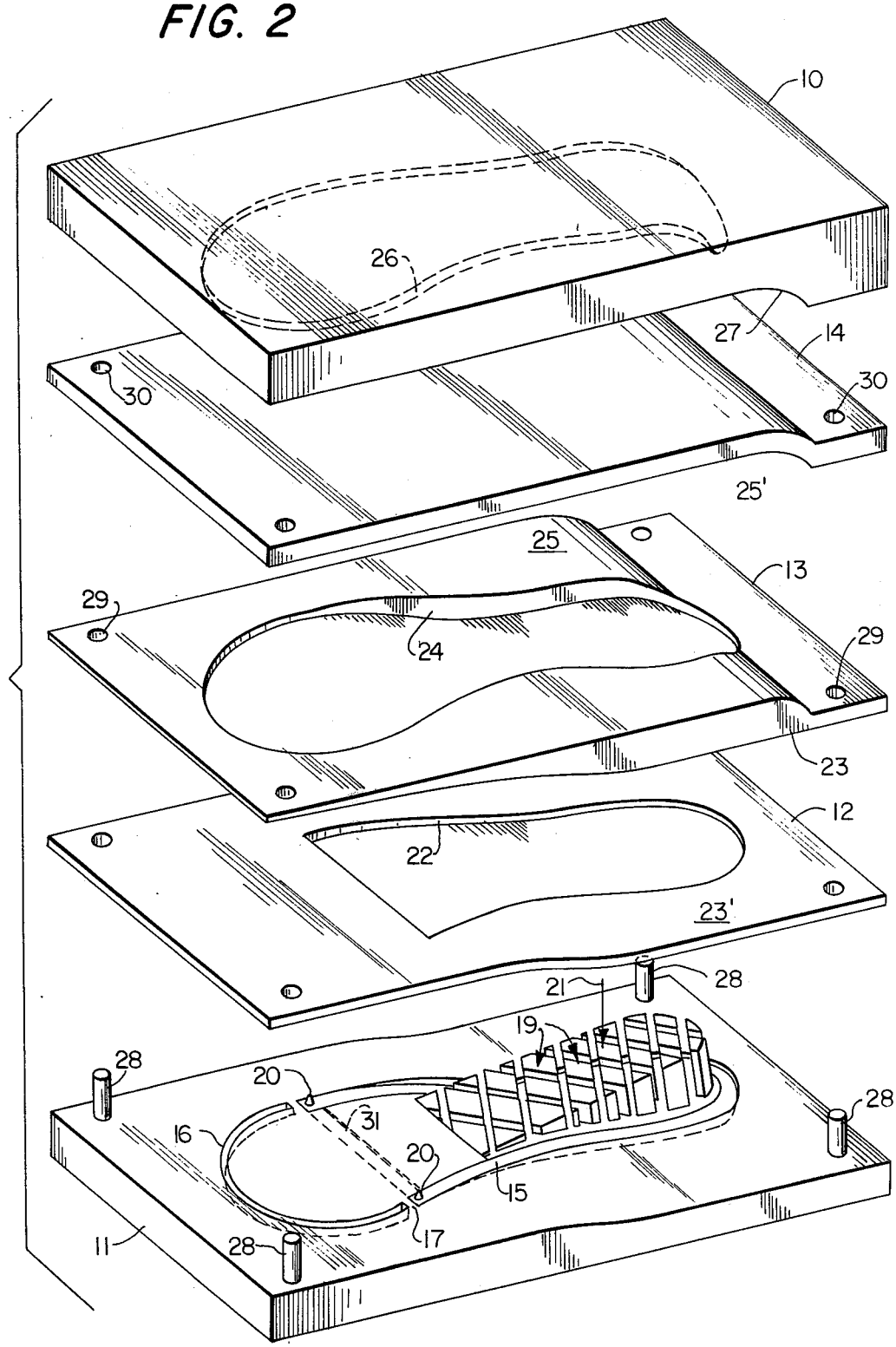

APPARATUS FOR THE PRODUCTION OF LAMINATED BODIES PARTICULARLY, MULTILAYERED SHOE SOLES

This is a division, of application Ser. No. 722,418, filed Sept. 13, 1976.

BACKGROUND OF THE INVENTION

1. Field of the Invention

This invention relates to a and vulcanization mold for the production of laminated bodies, especially shaped shoe soles, from several layers of different and/or differently colored rubber or plastic, which mold includes several superimposed, shaped, mold cavities for preshaping the individual layers and which are separated from one another by intermediate plates removable from the vulcanization mold in order to unite the preshaped layers.

2. Description of the Prior Art

From German AS No. 1236771, a vulcanization mold for the production of a structured heel from rubber or an equivalent raw material, the heel having a heel-tap made from a rubber which is different as compared to the rubber of the heel, is known. The mold consists of a lower mold, a middle mold having a chamber for the heel and an upper mold, and a moveable intermediate plate which can be inserted loosely between the middle mold and the lower mold having a chamber for the heel-tap. With this vulcanization mold, blanks of different working material are molded simultaneously under pressure and temperature and are prevulcanized and are thereafter united following removal of the intermediate plate and are fully cured under pressure and temperature into a laminated body. Additionally, a vulcanization mold has been proposed for the production of elastic bottom parts of shoes of two layers of different composition. The layers are prefabricated in nests of molds separated from one another by an intermediate plate and are hardened together after removal of the intermediate plate, the flat, intermediate plate being developed more thinly at one end corresponding to the angle of deviation running differently from the plane of the mold separation.

With such molding tools for vulcanization, however, only layers with flat, i.e., planar contact, or interfacial, surfaces can be joined because of the shaping of the intermediate plate as a plate of essentially constant thickness, but not layers where the interfacial surfaces between the different working materials run in spatial separating surfaces deviating from the plane.

For the production of laminated bodies, especially of multilayered rubber molded soles, it is also known to harden individual layers in separate individual molds and then to join these layers in a common mold, possibly with the aid of an adhesive. This method however must be carried out in steps requiring much labor and is too expensive, therefore, for large scale production. Additionally, the joining together of the layers by means of adhesives creates ugly and poor transition areas between the layers which increases the quota of rejects, and the correction of which (transition areas) requires an expensive mechanical, secondary processing. Moreover, the bonded areas are endangered insofar as they can separate under load.

The present invention is based on the object of developing a form of vulcanization such that the production of laminated bodies from different work materials is made possible, the interfacial surfaces of which run in planes deviating from one another, or are non-planar. With this method of vulcanization, it is to be possible to manufacture laminated bodies of more than two layers on a large scale with a small technical and apparatus expenditure. There should be the possibility for interfacial surfaces on opposing sides of the middle layer to deviate from one another. It is an object to provide a vulcanization mold with which it is possible to produce multilayered molded soles, wherein the individual layers are developed with perfect transition areas.

SUMMARY OF THE INVENTION

The foregoing objects are accomplished according to the present invention by the provision of a vulcanization mold consisting of a lower mold, an upper mold, two intermediate plates which limit and define a mold cavity for one layer, the upper and lower separating surfaces running spatially variably in relation to the adjacent layers, whereby the two intermediate plates are separated from one another by a center plate freely moveable in the direction of opening and closing of the vulcanization mold, which center plate has a recess, or opening, producing the lateral boundary of the molded part of the hollow space, or mold cavity, and surfaces corresponding to the adjacent surfaces of the adjacent intermediate plates.

With a vulcanization mold developed in such a way, it is possible to produce in a profitable manner laminated bodies with varying dimensions of thickness of the individual layers but with precisely fitting adjacent border surfaces. I.e., it is possible to produce a structure of a laminated body, which is particularly attractive for modern rubber, respectively, plastic, shoe soles. With this vulcanization mold it is possible to produce rationally and simply in one operating cycle molded soles from more than two layers with different interfaces.

In order to reduce the weight of the laminated body and, at the same time, to make it more elastic, which can be important particularly for shoe soles of sports shoes, provision is made in a further development or embodiment, of the invention for a displacer or displacing means, which projects into the mold cavity for the middle layer and is moveable in the direction of opening and closing of the vulcanization mold. The displacer, for the formation of ribs in the layer, is equipped with pegs, or projections, which are disposed at a distance from the recess of the middle plate. At the same time, the displacer can be lifted or lowered by means of a wedge shiftable in the lower part of the mold and can be encompassed with a snug fit by the recess of the intermediate plate covering the mold cavities of and resting on the lower part of the mold.

In order to safeguard against undesirable horizontal movement of the individual components of the vulcanization mold during the production process as a result of operating pressures and pressure changes, there are provided according to a further embodiment of the invention, guiding and/or centering bolts between the two halves of the mold.

A further embodiment of the invention is characterized by the fact that adjacent to the front ends of a mold cavity located in the lower part of the mold, bolts, pegs or elevations are provided during prefabrication in order to anchor the work material.

So that one need not fear any adhesion of the prevulcanizates or of the finished product to the walls of the mold cavity, the intermediate plates and the center plate can be chrome-plated, polished steel or light metal plates provided with non-sticking surface coatings, or release coatings, e.g., of polytetrafluoroethylene.

BRIEF DESCRIPTION OF THE DRAWINGS

In the drawings an embodiment of the vulcanization molding tool according to the invention for the production of a multilayered shoe sole is shown.

FIG. 2 shows individual parts in perspective of the vulcanization mold ready for operation;

DESCRIPTION OF PREFERRED EMBODIMENTS

Figure 1:
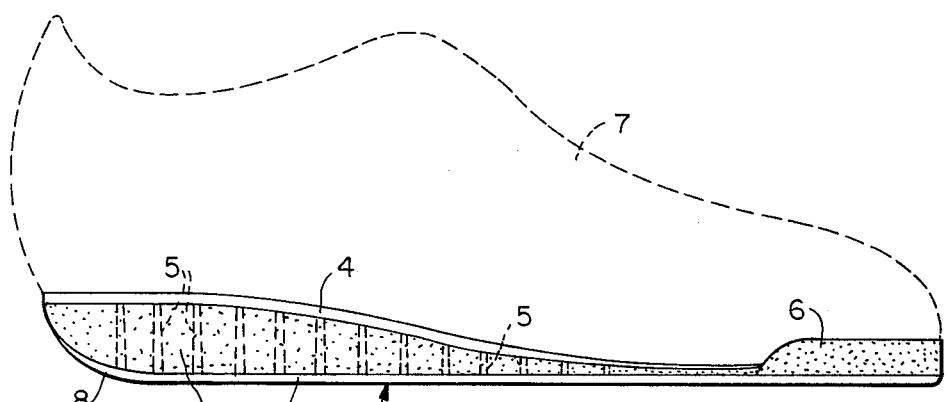
FIG. 1 shows a side view of a multilayered sole.

FIG. 1 shows a side view of a rubber molded sole 1, which consists of layers of rubber mixtures of different elasticity and color. The actual walking layer 2 consists of a synthetic rubber mixture or else of an extender with high abrasion resistance and with good feel and great resistance to cutting. It extends in approximately constant thickness from the heel part 8 (pulled in a rounded manner) to the tip of the sole. Above it lies a wedge shaped intermediate layer 3 which extends to the tip of the sole and which has a semi-circular tip protector 6 in front. It consists of natural rubber, has good damping properties and has been dyed differently as compared to walking layer 2. On the middle layer 3 lies a layer 4 of an edge strip which extends only in the area of the edge of the molded sole and which serves for the connection of the molded sole with the upper part of the shoe 7, shown in broken line.

In the central area of the molded sole 1, the surface of the middle layer 3 projects upwardly. The layer 3 has vertical ribs 5 in the area of the heel. The ribbing of the middle layer 3 of the sole produces a desired savings in weight of the molded sole and moreover improves the elasticity in the area of the heel. The individual layers 2, 3 and 4 are separated from one another by exact demarcation lines.

FIG. 2 shows a vulcanization mold for the production of the molded sole according to FIG. 1, shown in a wide open state. Between an upper mold component 10 and a lower mold component 11, there are a first intermediate plate 12, a middle plate 13 mounted freely moveable in the direction of separation of the mold and a second intermediate plate 14. In the lower mold component 11 of the mold on the top side mold cavity 15 is milled out for the layer 4 of the edge strip, which is followed by a mold cavity 16 for the semicircular tip protector 6. The two mold cavities 15 and 16 are divided from one another by a threshold 17. The mold cavity 15 limits a wedgeshaped displacer 18 open toward the top which serves for the production of the rib part of the heel of the molded sole. The displacer 18 is provided with diverging pegs 19 and decreases in height in the direction toward the tip of the molded sole. In the area in which the mold cavity 15 ends, bolts 20 have been disposed, the purpose of which will be explained below. The separation of the mold component 11 of the mold is made to correspond to the course of the level of the edge strip layer 4 of the molded sole 1, i.e., in the drawing, it runs from left to right gradually sloping downwards. The wedgeshaped displacer 18 is mounted moveably in the lower part of the mold, i.e., it moves toward the lower part of the mold in the direction of the arrow 21. The intermediate plate 12 is placed onto the lower mold component 11 of the mold. The intermediate plate corresponds in its outline to the curved surface of the lower part of the mold.

The intermediate plate 12 has an opening 22 which fits snugly over the displacer 18 in such a way that it covers up completely the mold cavity 15.

The middle plate 13 is situated on top of the intermediate plate 12 and the lower side 23 is adapted to the outline of the upper side 23' of the intermediate plate 12 and, respectively, the top side of the molded lower part 11. The middle plate 13 extends over the entire length of the lower part of the mold and in its middle area it has an opening for the formation of the mold cavity 24 which corresponds to the middle layer 3 of the molded sole 1. Since the shape of the middle layer 3 as a result of the configuration of the sole and as a result of the rounded formation of the heel is not of a uniform thickness, the thickness of the middle plate is also adapted to the shape of the middle layer 3. In the area of the tip of the sole, the middle layer 3, is quite thin, in the middle area it gradually becomes thicker, while it again becomes thinner corresponding to curvature 25 of the middle plate 13 toward the end of the sole. The outline of the mold cavity 24 is dimensioned such that the displacer 18 of the lower part of the mold 11 projects through the intermediate plate 12 up to the level of the upper surface of the middle plate 13.

The intermediate plate 14 is situated on the middle plate 13 and is curved negatively corresponding to the upper surface of middle plate 13. I.e., the curvature 25' on the bottom side of the intermediate plate 14 corresponds to curvature 25 on the upper side of middle plate 13. Intermediate plate 14 is otherwise of approximately uniform thickness and completely covers the mold cavity 24 in the middle plate 13.

The upper mold component 10 of the mold fits onto the intermediate plate 14, which contains the mold cavity 26 for forming the walking layer 2 of the sole. In view of the rounded part 8 of the heel of the molded sole 1, the upper mold component 10 also has a curvature 27. The mold cavity 26 for forming the walking layer 2 is covered in its entirety by the top side of the intermediate plate 14.

In the upper part of the mold or in the lower part of the mold, centering means such as centering pegs, respectively, centering bolts 28, are provided as customary. The centering pegs 28 project through corresponding bores 29 and 30 in the intermediate plates and in the middle plate to secure the positioning of the plates.

For the production of a molded sole 1, blanks roughly synchronized in volume to the individual layers and made of variable rubber mixtures are inserted into the individual mold cavities. Into mold cavity 15 a blank corresponding to layer 4 is inserted; into mold cavity 16 a blank for the tip protector is inserted; and after that the intermediate plate 12 is placed over displacer 18 onto the lower mold component. Then follows middle plate 13 until it rests flush on intermediate plate 12 and the displacer 18 is submerged into mold cavity 24. A blank for the middle layer 3 is placed into mold cavity 24. Intermediate plate 14 is then placed onto middle plate 13. A blank for the walking layer 2 is inserted into mold cavity 26 and the upper mold component 10 is moved downwardly until the individual parts fit directly one against the other.

Figure 3:
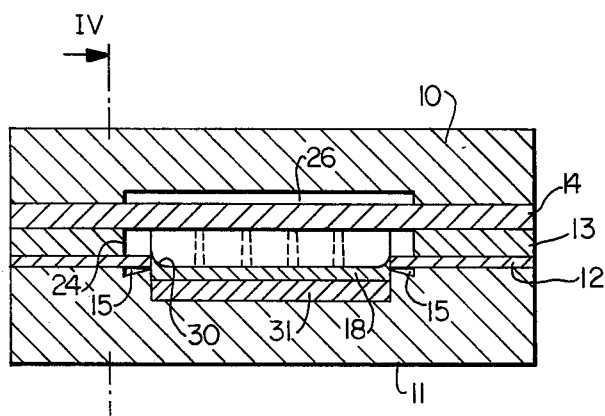
FIG. 3 shows a cross-section through the closed vulcanization mold in the area of the heel during prevulcanization.
Figure 4:
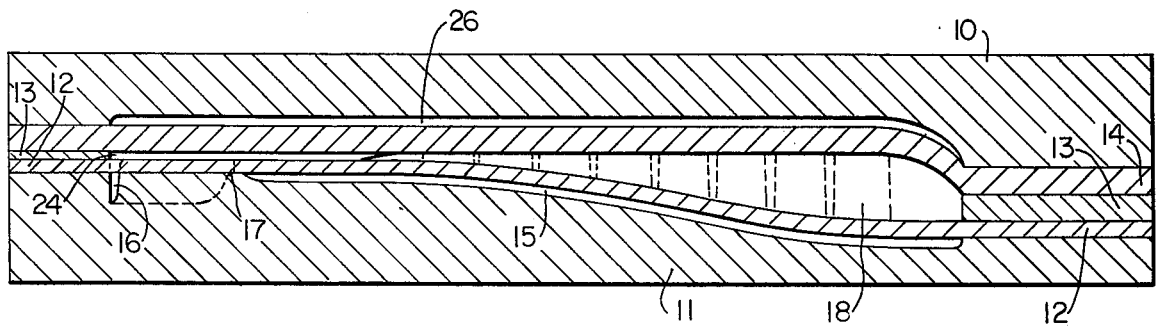
FIG. 4 shows a cross-section of the closed mold taken along line IV—IV of FIG. 3.

The vulcanizing mold, or molding tool, ready for operation is shown in FIGS. 3 and 4. From FIG. 3 it can be seen how the individual mold cavities 15, 16, 24 and 26 are separated by the intermediate plate 12 and 14.

In the middle plate 13, the mold cavity 24 for the middle layer 3 of the molded sole 1 and the displacer 18 with its pegs 19, extending therein, becomes recognizable. For a better separation of the mold cavity 15 from the mold cavity 24, the displacer 18 is provided with curvatures 30 preventing an overflowing of the rubber materials. The moveability of the displacer 18 is guaranteed, e.g., by the shiftable wedge 31, which by its shape pushes out the displacer 18 or allows it to slide back.

In FIG. 4, the vulcanizing mold of FIG. 3 is shown in a cross-section along the edge of the mold cavity 15 (IV — IV). In FIG. 4 it is seen how the threshold 17 acts to separate the mold cavity 15 for the edge strip 4 and the mold cavity 16 for the tip protector 6. As a result of the fact that the intermediate plate 12 with its bottom side rests on threshold 17, mold cavity 16 is separated from mold cavity 15. The upper side of the displacer 18 extends up to the underside of the intermediate plate 14. Pegs 19 are formed in the body of the so-called displacer 18 to provide hollow spaces for the ribs 5 of the molded sole 1. In this way, the rubber mixture flows in the hollow spaces.

After the mold is assembled, the individual parts of the sole are prevulcanized at vulcanization temperatures between 140° – 170° C in the closed vulcanization molding tool, until they are partially branched and have assumed a solid shape.

The necessary vulcanization time is determined especially by the physical value of the Mooney scorching. This value assures a lasting processibility of the mixtures used to the point that the heating times needed for the vulcanization will reach a safe value without there being any danger that a mixture in an unprocessed state could begin to branch spontaneously at ambient temperature.

After the time for prevulcanization, the vulcanization is interrupted, the vulcanization mold is opened and the intermediate plates 12 and 14 are removed. The middle plate 13 in which the middle layer 3 is molded and held, remains in the mold. When the vulcanizing mold is reclosed, the prevulcanized layers fit intimately against one another. As a result of the fact that the intermediate plate 12 has been removed, the displacer 18 is pushed back a distance corresponding to the thickness of the intermediate plate 12 into the inside of the lower mold component 11. Otherwise it would extend into the mold cavity 26.

The individual layers of the molded sole now fit against each other, adhere to one another and are cured. The total operating cycle is generally less than 10 minutes, a value which could not be achieved heretofore in the case of manufacturing such molded soles.

The prevulcanization of the blanks is carried out generally at a temperature of about 140° to 170° C, preferably at about 150° to 160° C. The removal of the intermediate plate generally takes place after about 0.5 to 5 minutes, preferably about 2 to 4 minutes. After that the final curing is accomplished generally at a temperature of about 150° to 180° C, preferably about 160° to 170° C over a time period of about 2 to 7 minutes, preferably about 3 to 6 minutes. The period of prevulcanization simultaneously guarantees that the prevulcanized blanks have a solid consistency but retain an adhesive capacity sufficiently strong to lastingly and firmly combine in the final curing. The pressure during the prevulcanization and final curing steps generally amounts to about 40 to 120 kg/cm$^2$, and preferably about 50 to 100 kg/cm$^2$.

As soon as the vulcanization is complete, the mold is opened and the now finished molded sole is taken out. As a result of the function of the intermediate plates, necessarily perfect separating surfaces of the individual layers from one another are guaranteed. Additionally, the arrangement of the pegs 20 in the lower part of the mold has assured that the free ends of the edge strips 4 cannot be pressed out sideways but are anchored on these pegs.

Employing the apparatus of the invention, differently colored molded soles with a highly decorative effect can be produced. The raw material mixtures used can have different compositions and characteristics. The prevulcanization in separate molding cavities guarantees that no coalescing what ever or displacement of the various working material mixtures can take place.

The vulcanization molding tools are developed effectively in the customary manner always for one pair of soles.

The removable intermediate plate and the moveably mounted middle plate are effectively made of a light metal sheet or a steel sheet which has been provided with antiadhesive, or releasable, surface coatings to ensure that upon opening of the mold after prevulcanization no adhesion of the prevulcanizates to the mold occurs.

The moveable mounting of the displacer 18 is made possible by providing the displacer 18 with an attachment which compensates for the thickness of the intermediate plate 12, which attachment is removed during the curing. Alternatively, the displacer 18 can be attached directly to the intermediate plate 12. For the curing of the molded sole, the displacer is not absolutely required.

In the molding tool according to the present invention, any given rubber and/or plastic molded article can be produced. In the above description the production of molded soles from different rubber mixtures has been described as an example. The layers or blanks, however, may also consist of other materials. The necessary changes in vulcanization times, temperatures and pressure can be easily determined by simple experiments.

For the blanks, one can use, for example, rubber mixtures having a Mooney-scorching ($T_5$ 135°) of approximately 3 to 8, preferably of about 4 to 6.5 can be used. In the case of selection of such rubber mixtures, operating cycles of less than 10 minutes will be achieved.

The mixtures with the selected characteristic Mooney values guarantee a safe processing without problems. Mixtures with smaller Mooney values are not as well suited, since the latter are inclined to automatic branching at ambient temperature.

The layers may be composed of vulcanizable elastic plastics such as, for example, thermoplastic elastomers, butadiene polymerizates, butadiene copolymers with styrene and/or acrylonitrile, isoprene polymerizates, isoprene copolymers with isobutylene, polyolefins, olefin diene terpolymers, chlorosulfonated polyethylene, ethylene vinyl acetate copolymers, polyacrylate, chloroprene polymerizates, rubber elastic polyurethane, silicon rubber and/or chlorohydrin-(co)-polymers.

I claim:

1. A vulcanization mold for producing a laminated article of at least three individual layers, the interfaces formed between the individual layers of the laminate being non-planer, wherein the mold comprises first and second outer mold plates, said first and second outer mold plates each having at least one mold cavity corresponding to the outer layers of the desired laminated article and each having a non-planar inner surface in which said at least one mold cavity is formed; a middle molding plate positioned between the first and second outer mold plates and movable in the direction of opening and closing of the mold and having an aperture corresponding to the middle layer of the desired laminate and having non-planar opposing surfaces corresponding to the inner surfaces of the first and second outer mold plates, respectively; and first and second intermediate plates, said first intermediate plate being removably positioned between the first outer mold plate and middle mold plate and said second intermediate plate being removably positioned between the second outer mold plate and the middle mold plate, each of said intermediate plates having a substantially uniform thickness and each having continuous non-planar surfaces, the surfaces of the first intermediate plate corresponding to the inner surface of the first outer mold plate and the surfaces of the second intermediate plate corresponding to the inner surface of the second outer mold plate; and wherein said molding plates and intermediate plates are arranged so as to be capable of forming a closed mold the mold cavities of which are aligned according to the alignment of the corresponding layers of the desired laminate.

2. The vulcanization mold of claim 1 wherein a displacing means is mounted on one of the outer mold plates and projects into the aperture of the middle mold plate; the displacing means conforming generally to the shape of a portion of said aperture; the upper surface of the displacing means extending to the surface of the middle mold plate opposite said outer mold plate; the displacing means being movable in the direction of opening and closing of the mold and being formed of a plurality of projecting means; and wherein the intermediate plate adjacent said outer mold plate has an aperture adapted to enclose said displacing means while at the same time covering said at least one mold cavity of the outer mold plate.

3. The vulcanization mold of claim 2, wherein the displacing means is lifted and lowered by means of a wedge shiftable in the outer mold plate.

4. The vulcanization mold of claim 1, wherein the intermediate plates and the middle mold plate are secured in their lateral positions between the two outer mold plates by guide means but are held moveably in the direction of opening and closing mold.

5. The vulcanization mold of claim 1, wherein means are provided in at least one of the outer mold plates in said at least one mold cavity for anchoring the working material during the processing.

6. The vulcanization mold of claim 1, wherein the intermediate plates and the middle molding plate are provided with a non-adhesive surface coating.

7. The vulcanization mold of claim 6 wherein said non-adhesive surface coating is polytetrafluoroethylene.

* * * * *